(12) United States Patent
Chen

(10) Patent No.: US 10,960,707 B2
(45) Date of Patent: Mar. 30, 2021

(54) BICYCLE HUB HAVING UNIDIRECTIONAL TRANSMISSION APPARATUS IN OPPOSITE POSITION

(71) Applicant: Drivetrain Tech Solution Inc., Taichung (TW)

(72) Inventor: Po Cheng Adrian Chen, Taichung (TW)

(73) Assignee: Drivetrain Tech Solution Inc., Taichung (TW)

( * ) Notice: Subject to any disclaimer, the term of this patent is extended or adjusted under 35 U.S.C. 154(b) by 35 days.

(21) Appl. No.: 16/533,428

(22) Filed: Aug. 6, 2019

(65) Prior Publication Data

US 2020/0114684 A1    Apr. 16, 2020

(30) Foreign Application Priority Data

Oct. 13, 2018   (TW) ................................ 10713610.8

(51) Int. Cl.
| | |
|---|---|
| *B60B 27/04* | (2006.01) |
| *F16D 41/30* | (2006.01) |
| *B60B 27/02* | (2006.01) |
| *B60B 27/00* | (2006.01) |

(52) U.S. Cl.
CPC ........ *B60B 27/023* (2013.01); *B60B 27/0078* (2013.01); *B60B 27/04* (2013.01); *F16D 41/30* (2013.01)

(58) Field of Classification Search
CPC .......... F16D 41/30; F16D 41/24; F16D 41/36; B60B 27/047; B60B 27/023
See application file for complete search history.

(56) References Cited

U.S. PATENT DOCUMENTS

| | | | | |
|---|---|---|---|---|
| 5,964,332 A | * | 10/1999 | King | B60B 27/023 192/46 |
| 6,558,288 B2 | * | 5/2003 | Okochi | B62M 11/16 192/64 |
| 2011/0094846 A1 | * | 4/2011 | Wu | B60B 27/047 192/64 |
| 2013/0126293 A1 | * | 5/2013 | Hsieh | F16D 41/30 192/64 |

FOREIGN PATENT DOCUMENTS

CN    106476533 A  *  3/2017

* cited by examiner

*Primary Examiner* — Ernesto A Suarez
*Assistant Examiner* — Lillian T Nguyen
(74) *Attorney, Agent, or Firm* — Wang Law Firm, Inc.

(57) ABSTRACT

A bicycle hub includes a housing, in which a first ratchet device, a second ratchet device, and an elastic device are received. The first ratchet device is rotated freely in the housing, and the second ratchet device is fixed to the housing. The first ratchet device has a first ratchet portion, the second ratchet device has a second ratchet portion, and the elastic device urges the first ratchet portion to engage the second ratchet portion of the second ratchet device when the first ratchet device is rotated in a direction. A driving device is connected to the first ratchet device to rotate at an end of the housing while the first and the second ratchet portions are located at an opposite end of the housing.

8 Claims, 9 Drawing Sheets

BICYCLE HUB HAVING UNIDIRECTIONAL TRANSMISSION APPARATUS IN OPPOSITE POSITION

BACKGROUND OF THE INVENTION

1. Technical Field

The present invention relates to a bicycle hub, and more particularly to a hub having a ratchet device in an opposite position.

2. Description of Related Art

A conventional bicycle hub includes a case, in which a gear and a driving device are received. The driving device has several ratchet members, and the ratchet members engage the gear, so that the driving device may rotate the gear and the case in one direction through the ratchet members.

In the conventional bicycle hub, the driving device is next to the gear and provides the gear a torque to rotate the case. With this structure, the torque always is exerted on an end of the case. It is unbalance to the entire hub, and the torque transmission is unstable.

BRIEF SUMMARY OF THE INVENTION

In view of the above, the primary objective of the present invention is to provide a bicycle hub, which provides a balance and stable torque transmission.

In order to achieve the objective of the present invention, a bicycle hub includes a housing having a first end and a second end opposite to the first end, wherein a channel is formed in the housing with opposite ends at the first end and second end respectively; a unidirectional transmission apparatus includes a first ratchet device, a second ratchet device, and an elastic device, wherein the first ratchet device has an axle member and a ratchet member connected to an end of the axle member; the first ratchet device is received in the channel of the housing with the ratchet member adjacent to the second end of the housing and an end of the axle member, which is opposite to the ratchet member, adjacent to the first end of the housing; the second ratchet device is received in the channel of the housing and connected to the housing to rotate with the housing; the second ratchet device is adjacent to the second end of the housing; the first ratchet device has a first ratchet portion on the ratchet member, and the second ratchet device has a second ratchet portion; the elastic device urges one of the first ratchet portion of the first ratchet device and the second ratchet portion of the second ratchet device; and a driving device next to the first end of the housing and connected to the end of the axle member of the first ratchet device adjacent to the first end of the housing to drive the first ratchet device to rotate in a first direction or a second direction which is a reverse direction of the first direction. The first ratchet portion of the first ratchet device engages the second ratchet portion of the second ratchet device to rotate the housing when the first ratchet device is rotated in the first direction, and the first ratchet portion of the first ratchet device disengages the second ratchet portion of the second ratchet device when the first ratchet device is rotated in the second direction.

In an embodiment, the first ratchet portion of the first ratchet device has a paw pivoted on the ratchet member; the second ratchet device has a ring member, and the ring member is fixed to the housing; the second ratchet portion has ratchet teeth on an inner side of the ring member; the elastic device urges the paw toward the ratchet teeth of the second ratchet device to engage the paw of the first ratchet device with the ratchet teeth of the second ratchet device.

In an embodiment, the ratchet member of the first ratchet device is provided with a slot, in which at least a portion of the paw is received.

In an embodiment, the ratchet member of the first ratchet device is received in the ring member of the second ratchet device.

In an embodiment, the first ratchet portion of the first ratchet device has ratchet teeth on an end of the ratchet member; the second ratchet portion of the second ratchet device has ratchet teeth facing the ratchet teeth of the first ratchet portion of the first ratchet device; the elastic device urges the second ratchet device toward the ratchet member of the first ratchet device to engage the ratchet teeth of the second ratchet portion of the second ratchet device with the ratchet teeth of the first ratchet portion of the first ratchet device.

In an embodiment, a diameter of the ratchet member of the first ratchet device is greater than that of the axle member of the first ratchet device; the ratchet teeth of the first ratchet portion of the first ratchet device are provided on the end of the ratchet member connected to the axle member; the second ratchet device has a ring member fitted to the axle member of the first ratchet device; the elastic device urges the ring member of the second ratchet device toward the ratchet member of the first ratchet device to engage the ratchet teeth of the second ratchet portion of the second ratchet device with the ratchet teeth of the first ratchet portion of the first ratchet device.

In an embodiment, the housing is provided with a first guiding member on a sidewall of the channel, and the second ratchet device is provided with a second guiding member; the second guiding member of the second ratchet device engages the first guiding member of the housing when the second ratchet device is received in the channel of the housing, so that the second ratchet device is movable related to the housing and rotated with the housing.

In an embodiment, the bicycle hub further includes a shaft and a shaft bearing, both of which are received in the channel of the housing, wherein the shaft passes through the first ratchet device, and the shaft bearing is mounted between the first ratchet device and the shaft.

In an embodiment, the bicycle hub further includes an axle bearing received in the channel of the housing, wherein the axle bearing is mounted between the axle member of the first ratchet device and the housing.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
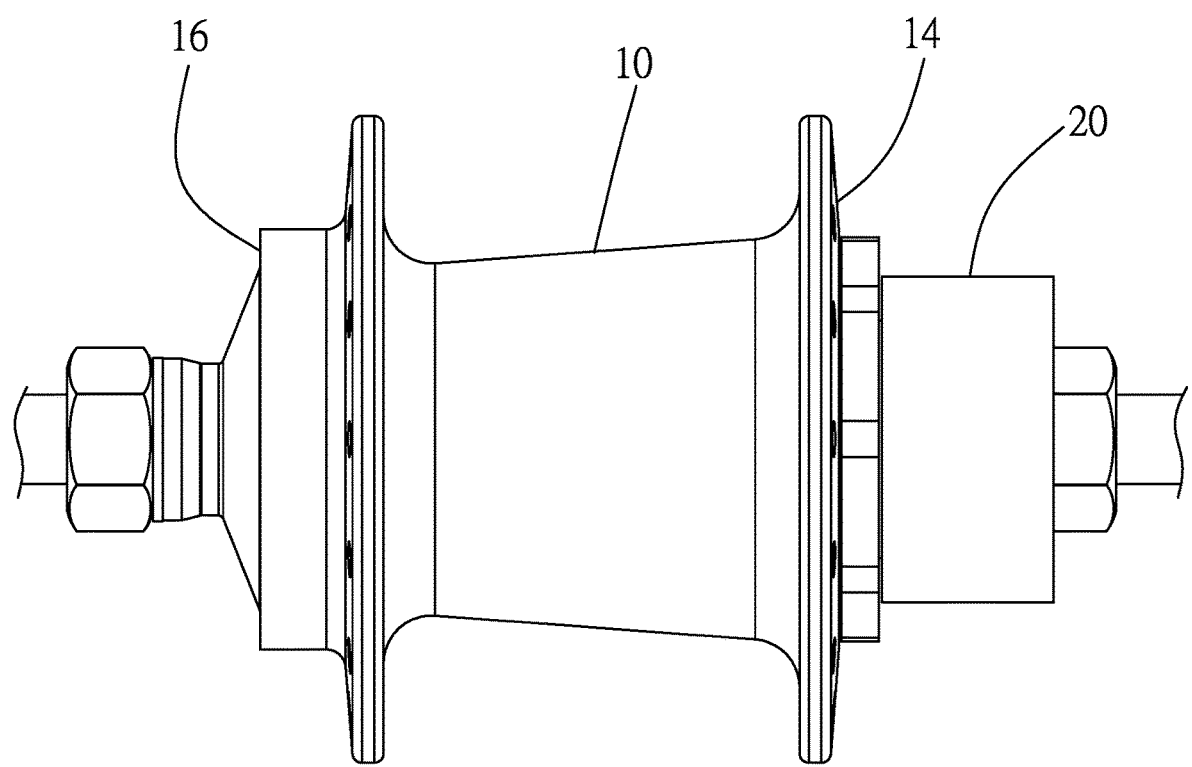
FIG. 1 is a front view of a first preferred embodiment of the present invention.
Figure 2:
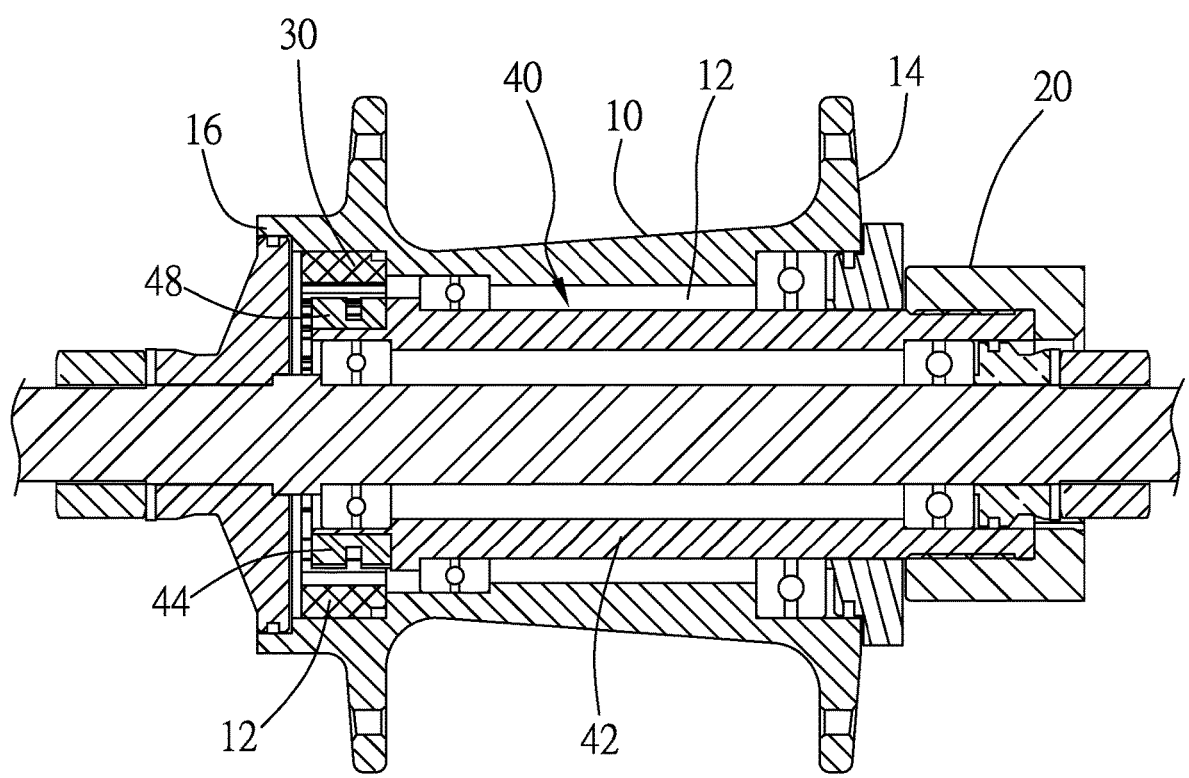
FIG. 2 is a sectional view of the first preferred embodiment of the present invention.

As shown in FIGS. 1 and 2, a bicycle hub of the first preferred embodiment of the present invention includes a housing 10 with a channel 12 therein. The housing 10 has a first end 14 and a second end 16 in an axial direction of the housing 10. The first and the second ends 14 and 16 of the housing 10 are on opposite open ends of the channel 12.

The bicycle hub further includes a driving device 20 next to the first end 14 of the housing 10. The driving device 20 is connected to a transmission device, such as a belt or a chain, to transmit a torque.

Figure 3:
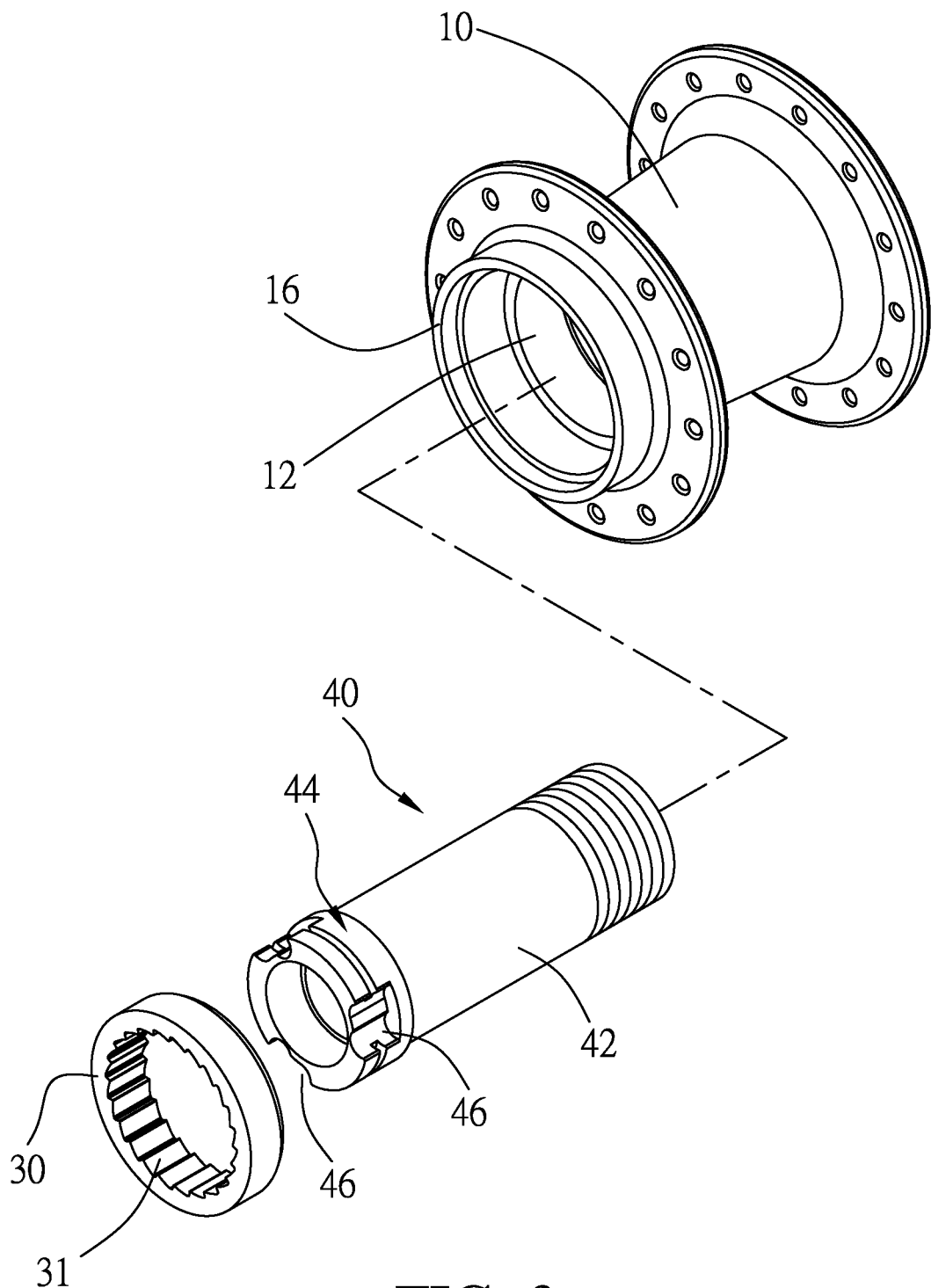
FIG. 3 is an exploded view of the first preferred embodiment of the present invention.
Figure 4:
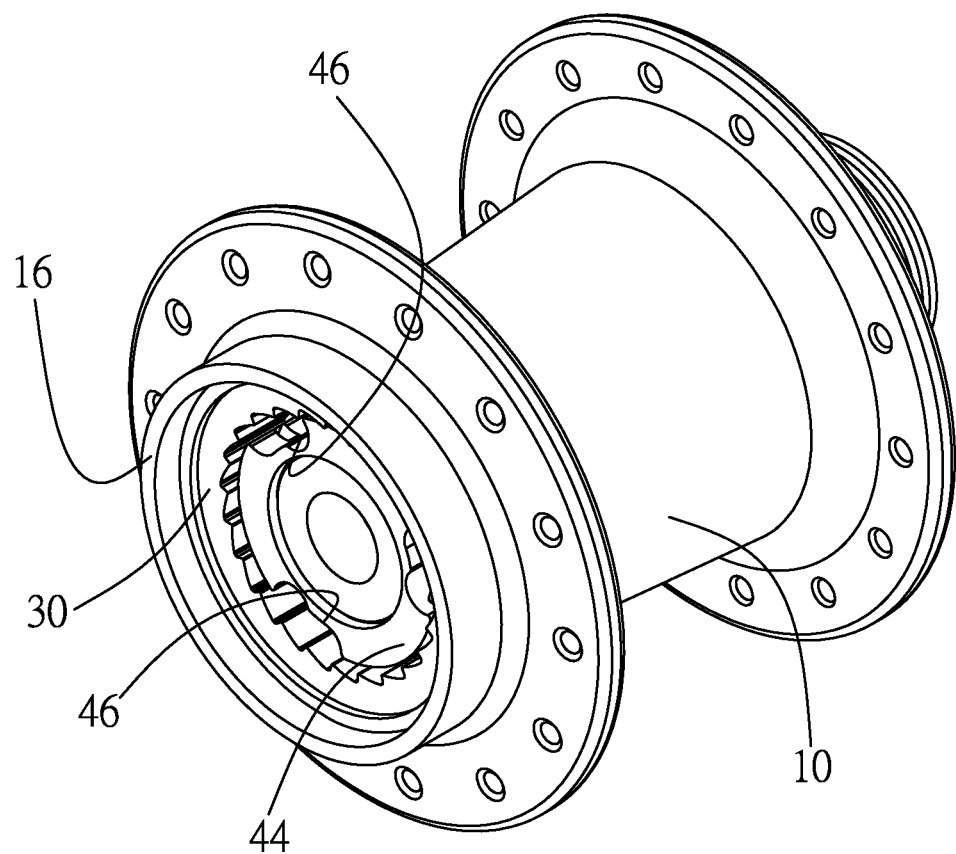
FIG. 4 is a perspective view of the first preferred embodiment of the present invention.

As shown in FIG. 3 and FIG. 4, the present invention includes a unidirectional transmission apparatus, which is an inner ring type ratchet mechanism, including a first ratchet device 40, a second ratchet device 30, and an elastic device. The first ratchet device 40 has an axle member 42 and a ratchet member 44 connected to an end of the axle member 42. The ratchet member 44 is provided with a plurality of slots 46 on a circumference thereof. The first ratchet device 40 is received in the channel 12 of the member 10. The second ratchet device 30 has a second ratchet portion 31. In the present embodiment, the second ratchet device 30 has a ring member, and the second ratchet portion 31 has ratchet teeth on an inner side of the ring member. The ring member of the second ratchet device 30 is fixed to the housing 10 and is adjacent to the second end 16 thereof. The ratchet member 44 of the first ratchet device 40 is received in the ring member of the second ratchet device 30 and the paw slots 46 are associated with the ratchet teeth of the second ratchet portion 31 of the second ratchet device 30.

Figure 5:
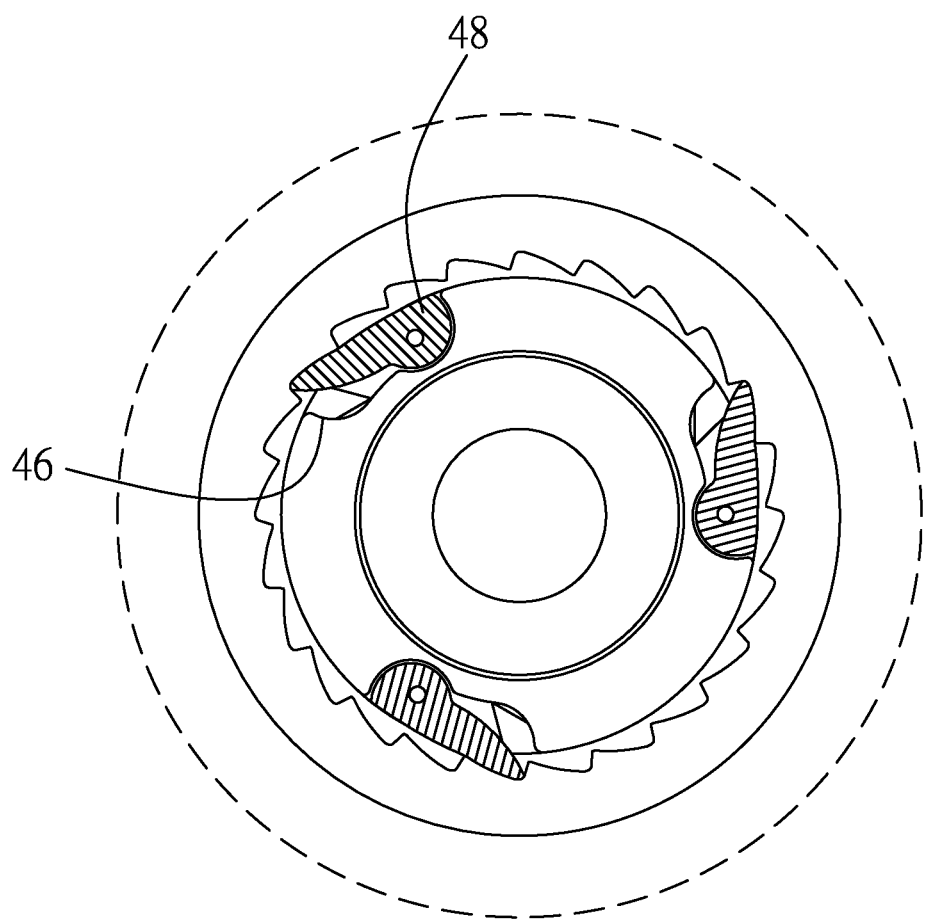
FIG. 5 is a sketch diagram of the first ratchet device and the second ratchet device of the first preferred embodiment of the present invention.

As shown in FIG. 5, the first ratchet device 40 further includes a first ratchet portion on the ratchet member 44. In the present embodiment, the first ratchet portion includes a plurality of paws 48 received in the slots 46 respectively, and pivoted on the ratchet member 44 of the first ratchet device 40. A plurality of elastic devices, such as springs, are provided between sidewalls of the slots 46 and the paws 48 respectively. The elastic devices urge the paws 48 toward the ratchet teeth of the second ratchet portion of the second ratchet device 30 respectively to engage paws 48 with the ratchet teeth of the second ratchet device 30.

As shown in FIG. 2, an end of the axle member 42 of the first ratchet device 40, which is opposite to the ratchet member 44 and faces the first end 14 of the housing 10, is connected to the driving device 20, so that the driving device 20 is able to drive the first ratchet device 40 to rotate in a first direction or a second direction which is a reverse direction of the first direction.

Figure 6:
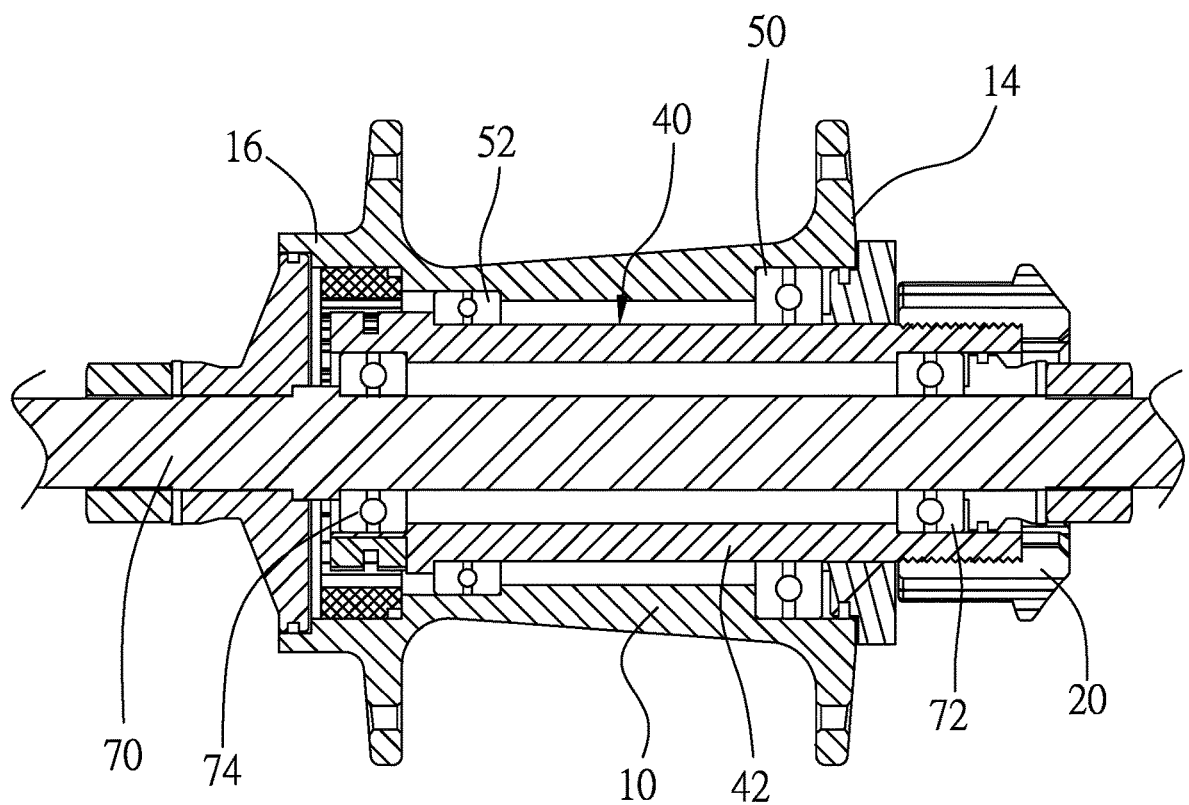
FIG. 6 is a sectional view of the first preferred embodiment of the present invention.

As shown in FIG. 6, two axle bearings 50, 52 are received in the channel 12 of the member 10 and fitted to the axle member 42 to make the first ratchet device 40 rotate freely in the channel 12.

A shaft 70 is received in the channel 12 of the housing 10 and passes through the first ratchet device 40 while two shaft bearings 72, 74 are fitted to the shaft 70 and attached to the first ratchet device 40 to make the first ratchet device 40 rotate freely related to the shaft 70.

When the driving device 20 drives the first ratchet device 40 to rotate in the first direction, the paws 48 of the first ratchet portion of the first ratchet device 40 engage the ratchet teeth of the second ratchet portion of the second ratchet device 30 and the second ratchet device 30 is rotated with the first ratchet device 40. As a result, the housing 10 is rotated. When the driving device 20 drives the first ratchet device 40 to rotate in the second direction, the paws 48 of the first ratchet portion of the first ratchet device 40 disengage the ratchet teeth of the second ratchet portion of the second ratchet device 30 and the second ratchet device 30 is free. As a result, the housing 10 stays still.

Figure 7:
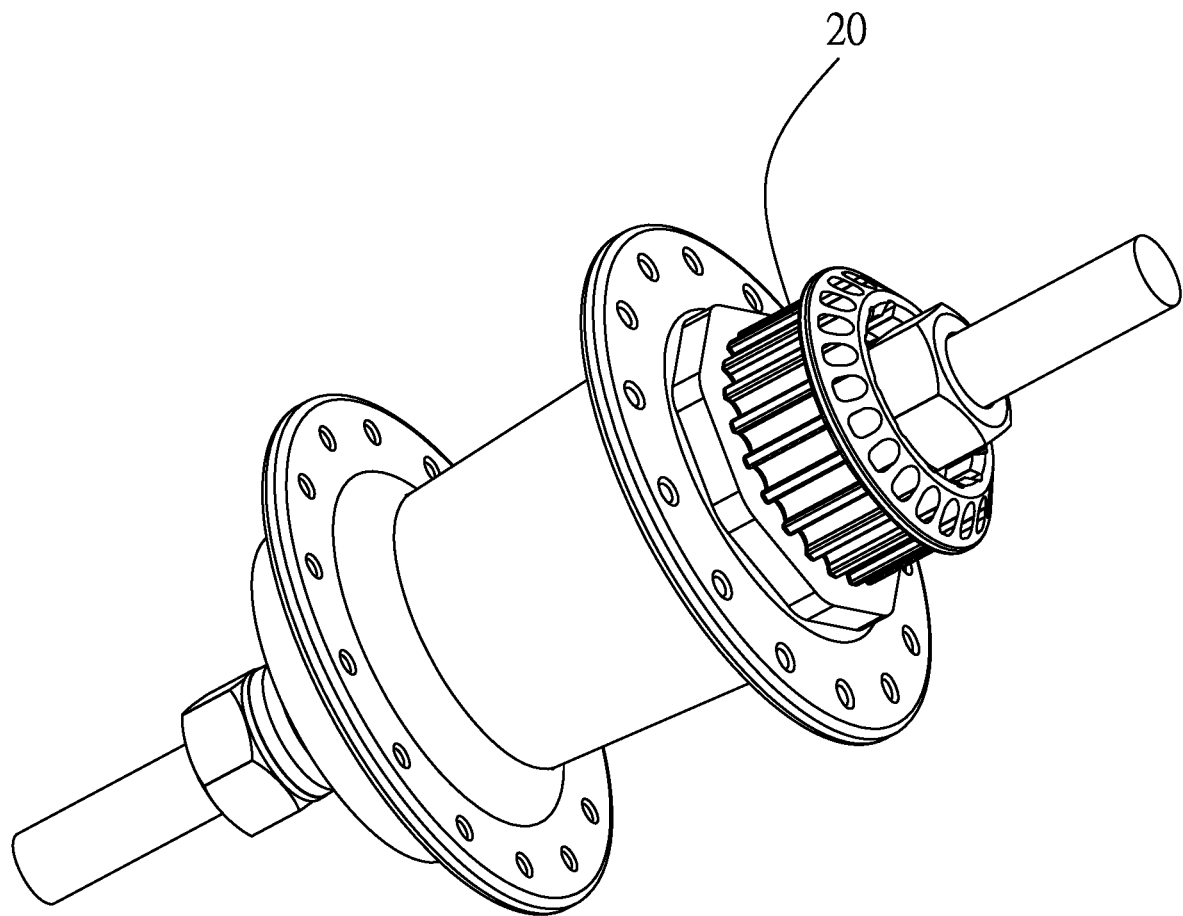
FIG. 7 is a perspective view of the first preferred embodiment of the present invention.

In the present preferred embodiment, the driving device 20 includes a pulley as shown in FIG. 7. The pulley is driven by a belt (not shown) and is screwed onto the axle member 42 of the first ratchet device 40 (FIG. 6).

Figure 8:
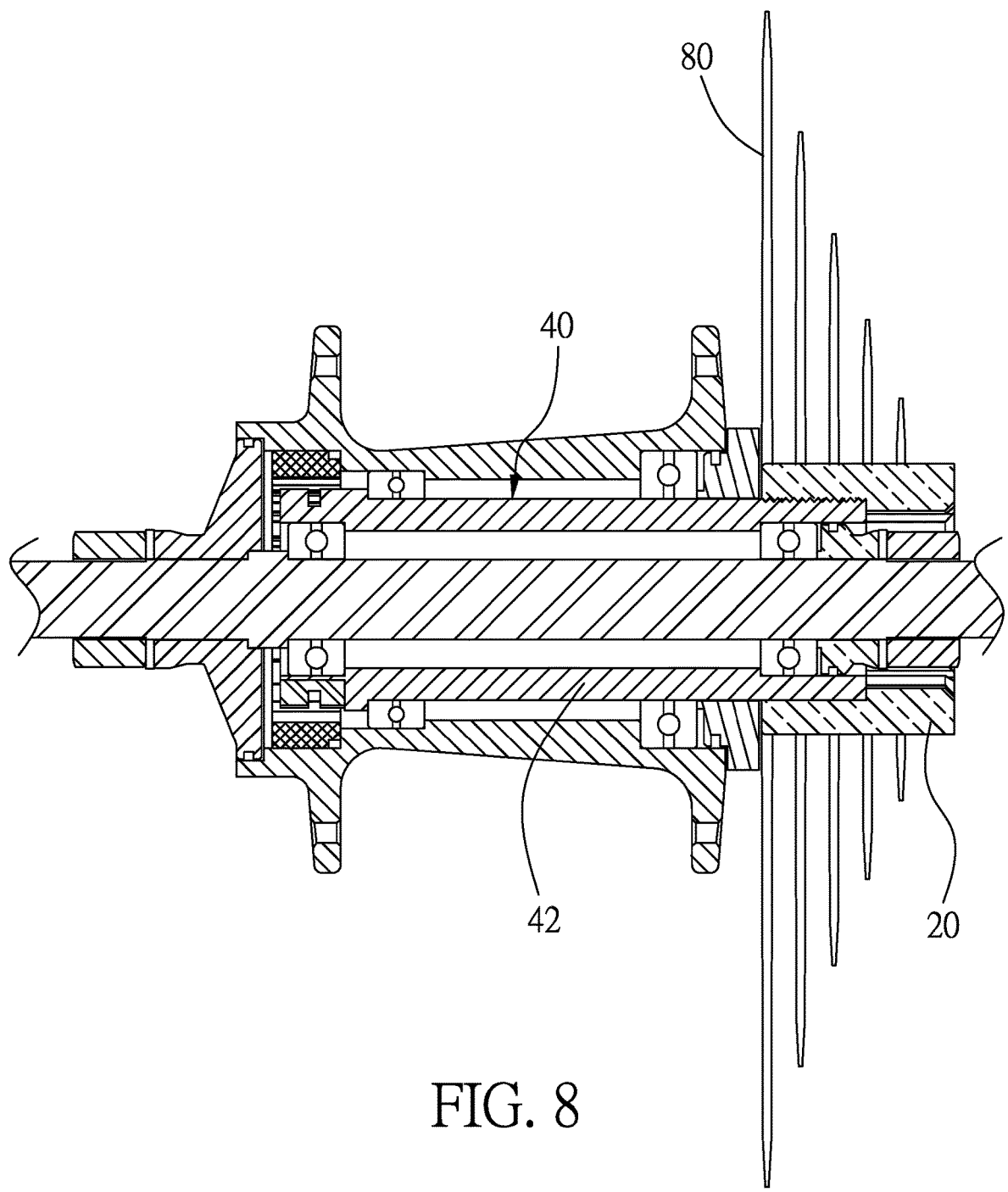
FIG. 8 is a sectional view of a second preferred embodiment of the present invention.

As shown in FIG. 8, the second preferred embodiment of the present invention provides the driving device 20 including a freehub screwed onto the axle member 42 of the first ratchet device 40. The freehub is connected to a cassette 80.

Figure 9:
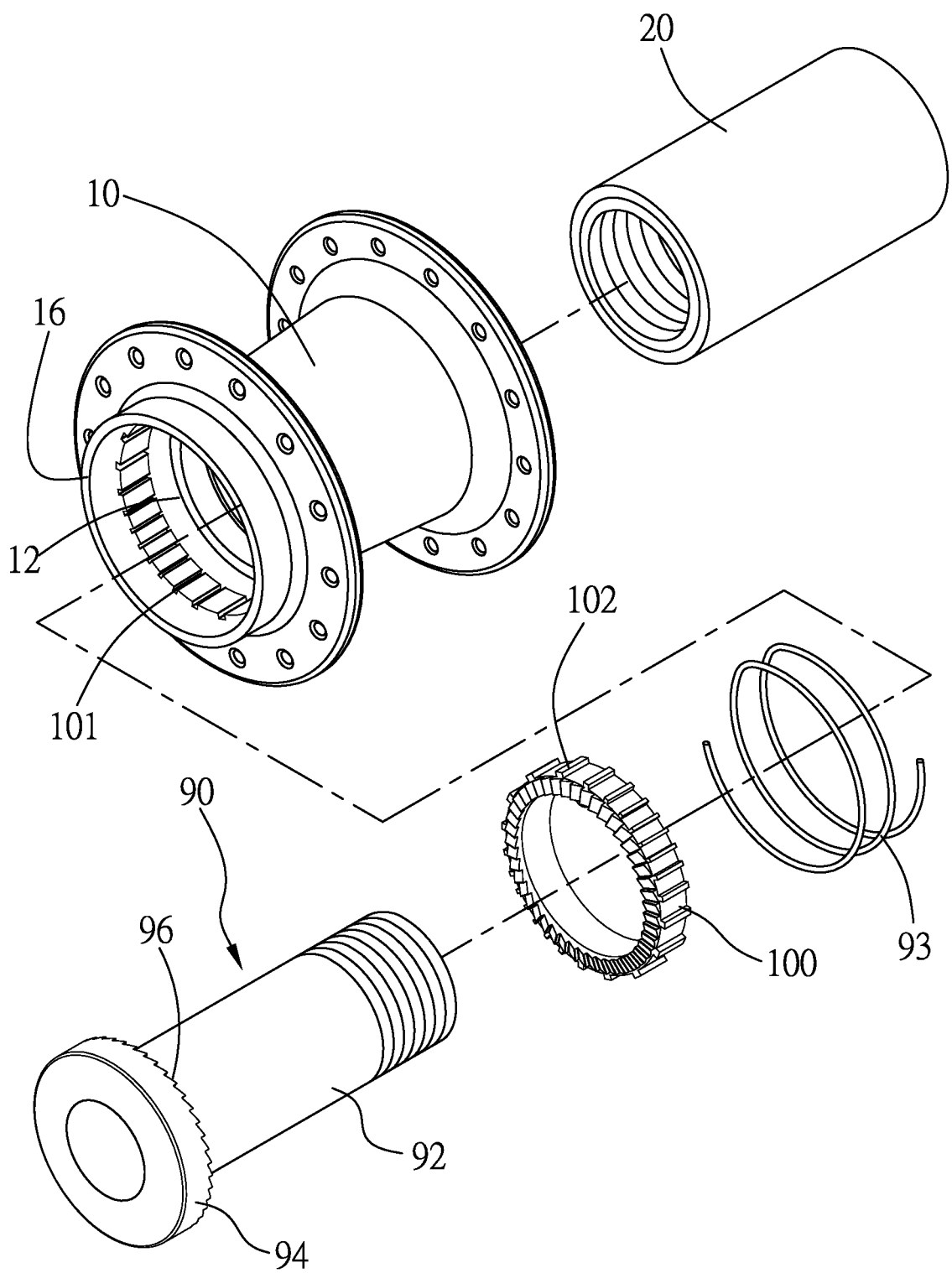
FIG. 9 is an exploded view of a third preferred embodiment of the present invention.

As shown in FIG. 9. The third preferred embodiment of the present invention provides a unidirectional transmission apparatus, including a first ratchet device 90 and a second ratchet device 100. The second ratchet device 100 has a ring member with ratchet teeth (the second ratchet portion) on an end thereof. The ring member of the second ratchet device 100 has second guiding members, which are protrusions on an outer side thereof, while the housing 10 has first guiding members 101, which are slots on a sidewall of the channel 12 of the housing 10. The second ratchet device 100 is received in the channel 12 of the housing 10 with the second guiding members 102 of the second ratchet device 100 engaging the first guiding members 101 of the housing 10, so that the second ratchet device 100 is movable related to the housing 10 and rotated with the housing 10. The first ratchet device 90 has an axle member 92 and a ratchet member 94 connected to an end of the axle member 92. A diameter of the ratchet member 94 is greater than that of the axle member 92. The ratchet member 94 is provided with a first ratchet portion 96, which has ratchet teeth on an end connected to the axle member 92. Both the first ratchet device 90 and the second ratchet device 100 are received in the channel 12 of the housing 10, and the ratchet teeth of the first ratchet portion 96 of the first ratchet device 90 face the ratchet teeth of the second ratchet portion of the second ratchet device 100. An elastic device 93, such as a spring, is fitted to the axle member 92 and urges the second ratchet device 100 toward the ratchet member 94 of the first ratchet device 90 to engage the ratchet teeth of the first ratchet portion 96 of the first ratchet device 90 with the ratchet teeth of the second ratchet device 100 when the first ratchet device 90 is rotated in the first direction.

With the combination of the second ratchet device 30 or 100 and the first ratchet device 40 or 90, the bicycle hub of the present invention is provided with a unidirectional transmission apparatus in an opposite position. Furthermore, the first ratchet device 40 or 90 is able to be connected to various driving device 20, such as pulley or freehub as described above or any other driving device, as the bicycle designer wants. In addition, the driving device and the unidirectional transmission apparatus are located at opposite sides of the housing, which provides a balanced torque transmission. The axle bearings, the shaft bearings, and the shaft are helpful to stabilize the rotation of the first ratchet device.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle hub, comprising:

a housing having a first end and a second end opposite to the first end, wherein a channel is formed in the housing with opposite ends at the first end and second end respectively;

a unidirectional transmission apparatus includes a first ratchet device, a second ratchet device, and an elastic device, wherein the first ratchet device has an axle member and a ratchet member connected to an end of the axle member; the first ratchet device is received in the channel of the housing with the ratchet member adjacent to the second end of the housing and an other end of the axle member which is opposite to the ratchet member, adjacent to the first end of the housing; the second ratchet device is received in the channel of the housing and connected to the housing to rotate with the housing; the second ratchet device is adjacent to the second end of the housing; the first ratchet device has a first ratchet portion on the ratchet member, and the second ratchet device has a second ratchet portion; the elastic device urges one of the first ratchet portion of the first ratchet device and the second ratchet portion of the second ratchet device; and a driving device next to the first end of the housing and connected to the other end of the axle member of the first ratchet device adjacent to the first end of the housing to drive the first ratchet device to rotate in a first direction or a second direction which is a reverse direction of the first direction;

wherein the first ratchet portion of the first ratchet device engages the second ratchet portion of the second ratchet device to rotate the housing when the first ratchet device is rotated in the first direction, and the first ratchet portion of the first ratchet device disengages the second ratchet portion of the second ratchet device when the first ratchet device is rotated in the second direction;

wherein an end of the first ratchet device extends out of the channel via the first end of the housing; the driving device is detachably connected to the end of the first ratchet device; the entire driving device is outside of the housing, and a cassette is fixed to the driving device.

2. The bicycle hub of claim 1, wherein the first ratchet portion of the first ratchet device has a pawl pivoted on the ratchet member; the second ratchet device has a ring member, and the ring member is fixed to the housing; the second ratchet portion has ratchet teeth on an inner side of the ring member; the elastic device urges the pawl toward the ratchet teeth of the second ratchet device to engage the pawl of the first ratchet device with the ratchet teeth of the second ratchet device.

3. The bicycle hub of claim 2, wherein the ratchet member of the first ratchet device is provided with a slot, in which at least a portion of the pawl is received.

4. The bicycle hub of claim 2, wherein the ratchet member of the first ratchet device is received in the ring member of the second ratchet device.

5. The bicycle hub of claim 1, wherein the first ratchet portion of the first ratchet device has ratchet teeth on an end of the ratchet member; the second ratchet portion of the second ratchet device has ratchet teeth facing the ratchet teeth of the first ratchet portion of the first ratchet device; the elastic device urges the second ratchet device toward the ratchet member of the first ratchet device to engage the ratchet teeth of the second ratchet portion of the second ratchet device with the ratchet teeth of the first ratchet portion of the first ratchet device.

6. The bicycle hub of claim 5, wherein a diameter of the ratchet member of the first ratchet device is greater than that of the axle member of the first ratchet device; the ratchet teeth of the first ratchet portion of the first ratchet device are provided on the end of the ratchet member connected to the axle member; the second ratchet device has a ring member fitted to the axle member of the first ratchet device; the elastic device urges the ring member of the second ratchet device toward the ratchet member of the first ratchet device to engage the ratchet teeth of the second ratchet portion of the second ratchet device with the ratchet teeth of the first ratchet portion of the first ratchet device.

7. The bicycle hub of claim 5, wherein the housing is provided with a first guiding member on a sidewall of the channel, and the second ratchet device is provided with a second guiding member; the second guiding member of the second ratchet device engages the first guiding member of the housing when the second ratchet device is received in the channel of the housing, so that the second ratchet device is movable related to the housing and rotated with the housing.

8. The bicycle hub of claim 1, further comprising a shaft and a shaft bearing, both of which are received in the channel of the housing, wherein the shaft passes through the first ratchet device, and the shaft bearing is mounted between the first ratchet device and the shaft.

* * * * *